Aug. 25, 1942.  S. F. UPHAM  2,294,258
CROSS-MEMBER FOR TIRE CHAINS
Filed March 26, 1940
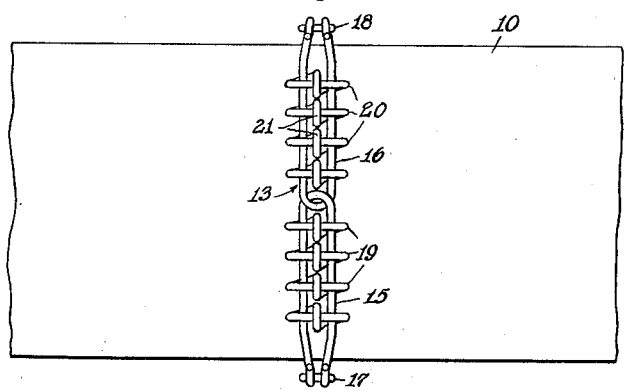
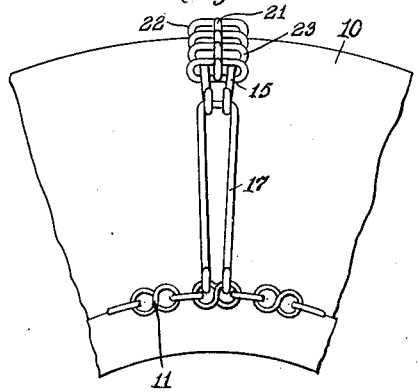
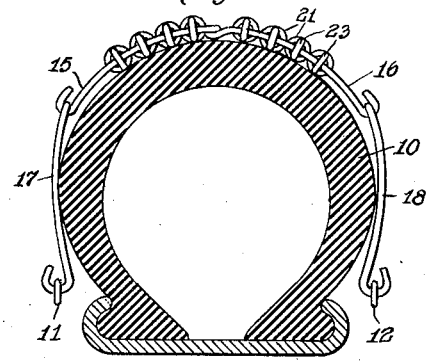
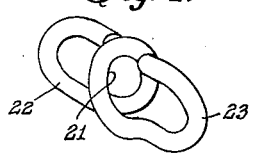
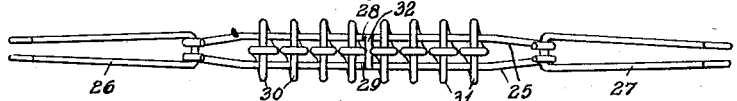
INVENTOR.
S. FOSTER UPHAM
BY
ATTORNEY.

Patented Aug. 25, 1942

2,294,258

UNITED STATES PATENT OFFICE 2,294,258

CROSS MEMBER FOR TIRE CHAINS

Samuel Foster Upham, Mamaroneck, N. Y.

Application March 26, 1940, Serial No. 325,953

8 Claims. (Cl. 152—232)

The invention relates to traction and anti-skid members as applied to the tires of automobiles and other self-propelled vehicles, and more especially of the chain type utilizing two flexible side chain portions joined by a plurality of cross-chains or links designed to contact the face or periphery of the tire.

Chains of this nature when attached to a rotating wheel are acted upon by centrifugal force to displace outwardly the side chains with respect to the center of the wheel upon which the entire chain assembly is mounted. This causes the cross-chains not in contact with the road surface to arch away from the tire periphery unless the said tire chain assembly has been applied thereto in a manner to avoid all slack. As a result, the links of the usual type of cross-chain and located immediately over the crown of the tire will be extended further from the periphery; and, other conditions remaining equal, such links will be the first to reach the pavement surface as the tire advances and hence are subject to greatest wear. Furthermore, as these links are disposed over the crown of the tire, they are immediately under the center of tire pressure when contacting the surface and the wear is thus increased, which is borne out in practice in that it is usually the center link of a cross-member, or one close thereto, which first fails.

It is an object of the present invention to provide a novel type of cross-member for the tire chain wherein the centrifugal force hereinbefore referred to is availed of to increase the wear and useful life of the cross-member.

Another object of the invention is to utilize such centrifugal force to feed into position reserve tread or traction-grip members as a particular element wears out and is freed from its cross-chain support.

Still another object of the invention is to provide a novel form of tread member and to mount the same slidably upon a cross-member.

A further object is to provide a tread member of a nature designed to prevent side-slipping of the vehicle safeguarded thereby as well as to afford a tractive member in promoting or retarding forward and backward movement of the car.

The invention has for an object, also, to provide a novel form of cross-member wherein the effective traction members will always be concentrated in the most efficient position, namely: substantially at or near the middle point of such cross-member.

In carrying out the invention, the side portions of the tire chain assembly may be the usual, conventional chains consisting of a plurality of interlinked rings or twisted links or the like and across which, over the periphery of the tire to be surrounded thereby, are hingedly connected cross-chains in the usual manner. Such cross-chains, however, in accordance with the invention, differ from the usual type of cross-chain in that the individual tread members composing the same are not interlinked but are free to ride with respect to the cross-chain as a whole independently and transversely with respect to the direction of travel of the tire. The extent of such displacement, however, is limited to substantially the middle position of the chain.

By this expedient, there are in effect two separate sets of tread members operative on opposite sides of the middle portion of the chain and, under centrifugal action, the same will continually be urged toward said middle portion which is the most effective location for a tread member. Furthermore, when a tread member or members in such location becomes sufficiently worn, it will automatically be discarded in the rotation of the tire to which the chain has been applied, and the next adjacent tread member will be advanced into position.

One of the embodiments of the invention contemplates a cross-chain affording a support which is hinged intermediate its connection to the side chains so that in installations wherein the side chains may yield slightly a cross-chain can buckle somewhat under the action of the centrifugal force and a greater tread area will thereby be concentrated at the effective contact point. The tread members, moreover, are so constructed as to afford spacer portions to maintain the individual tread elements of a group a predetermined distance apart, although it will be understood that each tread member is so mounted as to be freely slidable toward the middle portion of the cross-chain.

When most or all of the tread elements have been discarded, additional members may readily be installed to replace the same, the cross-chain comprising to this end a transverse support member adapted to be hooked at its opposite ends to the respective side chains or to intermediate elements. Provision is made for a stop or the like at substantially the middle of the cross-member to limit the inward travel of the slidable tread members. These are of novel construction and embody a spacer portion located in a plane at right angles to the direction of travel of the tire and terminating in opposite lateral loop portions substantially at right angles thereto, or lying in the direction of travel.

The nature of the invention, however, will best be understood when described in connection with the accompanying drawing, in which:

Fig. 1 is a plan view of the novel cross-chain as applied to an automobile tire.

Fig. 2 is a side elevation thereof, and Fig. 3 is a transverse section through the tire, with side-chains and cross-chains indicated in elevation.

Fig. 4 is a perspective view of a novel tread element which may be utilized in the cross-chain.

Fig. 5 is a plan view of a modified form of the novel cross-chain.

Fig. 6 is a fragmentary front elevation thereof.

Referring to the drawing, more particularly Figs. 1 to 4 thereof, 10 designates the usual shoe of an automobile tire and over which is designed to be mounted a conventional tire chain embodying opposite side chains 11 and 12 and a cross-member or chain 13 which, however, is of modified construction to enhance the non-skidding and tractive properties of the chain as a whole. To this end, the novel cross-member is composed of a support conforming substantially to the transverse curvature of the periphery of the shoe and including in the particular embodiment indicated in Figs. 1 to 3 two interlinked portions 15 and 16 which, in turn, may be further linked to the side chains by respective links 17 and 18. The interlinked portions 15 and 16 may be constructed of suitable stiff wire doubled back upon itself, as indicated, with its free ends bent into the form of a pair of adjacently disposed hooks to afford a hinged connection with the respective link elements 17 and 18 which may be of similar construction, as shown. At the closed end, the portions 15 and 16 are interlinked to complete the cross-chain member and also to afford a stop for the purpose hereinafter set forth. By thus linking the cross-member intermediate its length not only is the same more compactly formed for shipment and handling, but under centrifugal action may bow outwardly to enhance the tractive and anti-skid properties of the novel cross-chain.

The said portions 15 and 16 are designed to support slidably respective groups 19 and 20 of traction-grip elements or tread members. These tread members may slide on the support between the stop formed by the interlinked junction and the hooks at the respective ends of the wire portions 15 and 16. This will admit when the tire is in motion of the tread members responding to centrifugal force to urge them toward the stop or midway portion of the cross-chain, particularly if there is slack in the side chains, thereby concentrating the traction-grip elements at the most effective point.

These elements, moreover, are of such a nature as to promote not only increased traction but to prevent side-slipping of the vehicle supported by the tire; and, where there is appreciable slack, a cross-chain as a whole in swinging at the hinge into a V-position will bring into action against slip both of the active portions of a tread member, as well as enhance traction or braking. For example, under driving pressure, as well as under braking pressure, while a cross-member is in contact with the road, its angling at the hinge permits the propelling (or retarding) pressure to jam the traction-grip elements toward the stop and will thus compel them to remain in the position already established by the action of centrifugal force thereon, while the angular form of the entire assembly promotes added traction, especially when travelling on soft surfaces.

Such tread member is indicated more especially in Fig. 4 of the drawing and comprises in the embodiment shown a wire bent preferably to a substantial circular form as at 21 and then continued on opposite sides to provide lateral loops 22 and 23 substantially in a plane at right angles to the plane of said circular portion, the plane of the two loops bisecting the plane of the circular portion. When located upon respective interlinked support portions 15 and 16, the arms of such support portions are threaded through the respective loops so that the said loops lie in the plane of travel of the tire and the circular portion in a plane normal thereto.

In this position, the circular portion of a tread member serves also as a spacer means for maintaining the adjacent tread loops a sufficient distance apart when under the influence of centrifugal force and urged toward the midway portion of the cross-chain. Under this force, moreover, when a tread member becomes sufficiently worn to open up to such an extent as to become disengaged and cast loose from the support, it will make room for the next adjacent one to be advanced under the centrifugal force acting thereon to move into position and to replace the former. When it becomes necessary to replenish the tread members of a support portion, this may readily be effected by spreading the hooks at the free end thereof and inserting additional tread members.

In Figs. 5 and 6 a modified form of the support is illustrated, the same embodying a continuous portion 25 adapted to be linked to side chains (not shown), for example by the oppositely attached links 26 and 27. The portion 25 may comprise two parallel wires which are spread somewhat or kinked as at 28 and 29 substantially midway of the portion to afford thereat a stop for the slidable tread members 30 and 31 disposed over the said portion upon opposite sides of the said stop. In order to maintain the wires 25 properly spaced apart, a rod or wire 32 may be welded or otherwise secured in the depressed or kinked portions 28 and 29.

I claim:

1. A cross-member for a tire chain having oppositely disposed side chain elements, said member comprising a support adapted for attachment at its opposite ends to the side chain elements and affording a stop substantially midway of the support, and groups of tread members slidably mounted on the support respectively on opposite sides of the stop, the latter being adapted for engagement therewith to limit the travel of a group on its support away from the side chain elements.

2. A cross-member for a tire chain having oppositely disposed side chain elements, said member comprising a bowed support embodying separate portions hinged together substantially midway of the support, the latter being adapted for attachment at its opposite ends to the side chain elements and affording at the hinge a stop, and two groups of tread members slidably mounted on the support respectively on opposite sides of the stop.

3. A cross-member for a tire chain having oppositely disposed side chain elements, said member comprising a support including two doubled-back wire portions interlinked at the closed ends substantially midway of the support to afford a stop thereat, and two groups of tread members slidable on the respective portions.

4. A cross-member for a tire chain having oppositely disposed side chain elements, said member comprising a support including two parallel wires spread substantially midway of the support to afford a stop, and two groups of tread members slidably mounted on the support respectively on opposite sides of the stop.

5. A cross-member for a tire chain having oppositely disposed side chain elements, said member comprising a support adapted for attachment at its opposite ends to the side chain elements and affording a stop substantially midway of the support, and two groups of tread members slidably mounted on the support respectively upon opposite sides of the stop, each tread member including a spacer portion and a portion at right angles thereto.

6. A cross-member for a tire chain having oppositely disposed side chain elements, said member comprising a support adapted for attachment at its opposite ends to the side chain elements and affording a stop substantially midway of the support, and two groups of tread members slidably mounted on the support respectively upon opposite sides of the stop, each tread member including a spacer portion in a plane normal to the direction of travel of the tire and a portion in the plane of travel.

7. A cross-member for a tire chain having oppositely disposed side chain elements, said member comprising a support affording a stop substantially midway thereof, two groups of tread members slidably mounted on the support respectively on opposite sides of the stop, and a pair of removable link elements removably hinged respectively to the free ends of the tread-bearing portions and adapted at their opposite ends for connection with the respective side chain elements.

8. A traction-grip element for the cross-member of a tire chain, comprising a wire bent to substantially circular form and terminating upon opposite sides thereof in lateral loops substantially in a plane at right angles to the plane of the said circular portion and bisecting the same, the free ends of the wire being directed toward the circular portion.

S. FOSTER UPHAM.